United States Patent
Renckert et al.

(10) Patent No.: US 12,164,672 B2
(45) Date of Patent: Dec. 10, 2024

(54) SYSTEM AND METHOD FOR ANALYZING MICRO-ANOMALIES IN ANONYMIZED ELECTRONIC DATA

(71) Applicant: BANK OF AMERICA CORPORATION, Charlotte, NC (US)

(72) Inventors: Jennifer Tiffany Renckert, Middleburg, FL (US); Daniel Joseph Serna, The Colony, TX (US); Frank J. Yanan, Wheaton, IL (US); Jeffrey Kyle Johnson, Cornelius, NC (US); Benjamin Tweel, Romeoville, IL (US); Jake Michael Yara, Mint Hill, NC (US); Robert Cain Durbin, Jr., New Hope, PA (US); Sheng Tang Hsiang, New York, NY (US); Jack Lawson Bishop, III, Evanston, IL (US); James J. Siekman, Charlotte, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 189 days.

(21) Appl. No.: 18/072,856

(22) Filed: Dec. 1, 2022

(65) Prior Publication Data

US 2024/0184920 A1    Jun. 6, 2024

(51) Int. Cl.
    *G06F 21/00*    (2013.01)
    *G06F 21/62*    (2013.01)

(52) U.S. Cl.
    CPC .............. *G06F 21/6254* (2013.01)

(58) Field of Classification Search
    CPC .................................... G06F 21/6254
    See application file for complete search history.

(56) References Cited

U.S. PATENT DOCUMENTS

| | | |
|---|---|---|
| 5,659,593 A | 8/1997 | Tzvieli |
| 5,987,442 A | 11/1999 | Lewis |
| 6,597,777 B1 | 7/2003 | Ho |
| 8,880,893 B2 | 11/2014 | Moghe |
| 10,157,347 B1 | 12/2018 | Kasturi |
| 10,484,410 B2 | 11/2019 | Fenoglio |
| 10,817,530 B2 | 10/2020 | Siebel |
| 11,126,635 B2 | 9/2021 | Behzadi |
| 11,157,508 B2 | 10/2021 | Jagota |
| 11,416,476 B2 | 8/2022 | Thummala Abbigari |
| 11,444,784 B2 | 9/2022 | Hatti |
| 11,546,445 B2 | 1/2023 | Glaser |
| 2010/0223296 A1 | 9/2010 | Angus |
| 2011/0252426 A1 | 10/2011 | Antani |
| 2012/0054147 A1 | 3/2012 | Goetz |

(Continued)

*Primary Examiner* — Mahfuzur Rahman
(74) *Attorney, Agent, or Firm* — Moore & Van Allen PLLC; Sydney E. McKinney

(57) ABSTRACT

Systems, computer program products, and methods are described herein for analyzing micro-anomalies in anonymized electronic data. The present disclosure is configured to import or retrieve a first data set, process the first data set to develop at least one event-outcome projection, define an outcome projection data set, import or receive a monitored user data set, anonymize the monitored user data set, define an avatar data set process the avatar data set, wherein the steps of import or receive a monitored user data set, anonymize the monitored user data set, and define an avatar data set are repeated one or more times.

20 Claims, 5 Drawing Sheets

(56) References Cited

U.S. PATENT DOCUMENTS

| | | |
|---|---|---|
| 2016/0283713 A1 | 9/2016 | Brech |
| 2017/0173262 A1* | 6/2017 | Veltz ..................... G16H 20/17 |
| 2017/0224298 A1* | 8/2017 | Hannemann ........... A61B 6/469 |
| 2018/0039555 A1 | 2/2018 | Salunke |
| 2020/0159961 A1* | 5/2020 | Smith ................... G06F 9/5044 |
| 2021/0271585 A1 | 9/2021 | Bastianelli |
| 2022/0237191 A1 | 7/2022 | White |
| 2023/0032926 A1 | 2/2023 | Kligman |
| 2024/0184920 A1* | 6/2024 | Renckert ............. G06F 21/6254 |

* cited by examiner

SYSTEM AND METHOD FOR ANALYZING MICRO-ANOMALIES IN ANONYMIZED ELECTRONIC DATA

TECHNOLOGICAL FIELD

Example embodiments of the present disclosure relate to systems and methods for analyzing micro-anomalies in anonymized electronic data.

BACKGROUND

Micro-anomalies in data sets are often the earliest indicators of a significant change or event. However, these micro-anomalies are often imperceptible through physical observation alone and must be collected as a data set for analysis. Applicant has identified a number of problems associated with current systems and methods for analyzing micro-anomalies in electronic data, and, through applied effort, ingenuity, and innovation, has solved many of these problems by developing solutions that are included in embodiments of the present disclosure, many examples of which are described in detail herein.

BRIEF SUMMARY

Systems, methods, and computer program products are provided for analyzing micro-anomalies in electronic data.

In one aspect, a system for analyzing micro-anomalies in electronic data is provided. The system comprises a communication device, at least one non-transitory storage device and at least one processor coupled to the at least one non-transitory storage device.

The at least one processor is configured to import or retrieve a first data set comprising a plurality of events and a plurality of event outcomes and process the first data set to develop at least one event-outcome projection comprising at least one of the events comprising the plurality of events and at least one of the event outcomes comprising the plurality of event outcomes and define an outcome projection data set comprising the at least one event-outcome projection. Further, the at least one processor is configured to import or receive a monitored user data set comprising both personal user information and monitored information, anonymize the monitored user data set by deleting the personal information and attributing the monitored information to an avatar. Additionally, the processor is configured to define an avatar data set comprising the monitored information attributed to the avatar and process the avatar data set by analyzing the avatar data set with respect to the outcome projection data set. In preferred embodiments, the steps of import or receive a monitored user data set, anonymize the monitored user data set, and define an avatar data set are repeated one or more times.

In another aspect, a computer program product for analyzing micro-anomalies in anonymized electronic data is provided. The computer program product comprises at least one non-transitory, computer-readable medium comprising code causing an apparatus to import or retrieve a first data set comprising a plurality of events and a plurality of event outcomes and process the first data set to develop at least one event-outcome projection comprising at least one of the events comprising the plurality of events and at least one of the event outcomes comprising the plurality of event outcomes and define an outcome projection data set comprising the at least one event-outcome projection. Further, the code may cause the apparatus to import or receive a monitored user data set comprising both personal information and monitored information, anonymize the monitored user data set by deleting the personal information and attributing the monitored information to an avatar. Additionally, the code may cause the apparatus to define an avatar data set comprising the monitored information attributed to the avatar and process the avatar data set by analyzing the avatar data set with respect to the outcome projection data set. In preferred embodiments, the code may cause the apparatus to repeat the steps of import or receive a monitored user data set, anonymize the monitored user data set, and define an avatar data set one or more times.

In a final aspect, a method for analyzing micro-anomalies in anonymized electronic data is described. The method comprises importing or retrieving a first data set comprising a plurality of events and a plurality of event outcomes and processing the first data set to develop at least one event-outcome projection comprising at least one of the events comprising the plurality of events and at least one of the event outcomes comprising the plurality of event outcomes and defining an outcome projection data set comprising the at least one event-outcome projection.

The method further comprises importing or receiving a monitored user data set comprising both personal information and monitored information, anonymizing the monitored user data set by deleting the personal information and attributing the monitored information to an avatar, defining an avatar data set and processing the avatar data set by analyzing the avatar data set with respect to the outcome projection data set. Each of importing or receiving a monitored user data set, anonymizing the monitored user data set, and defining an avatar data set may be repeated one or more times.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
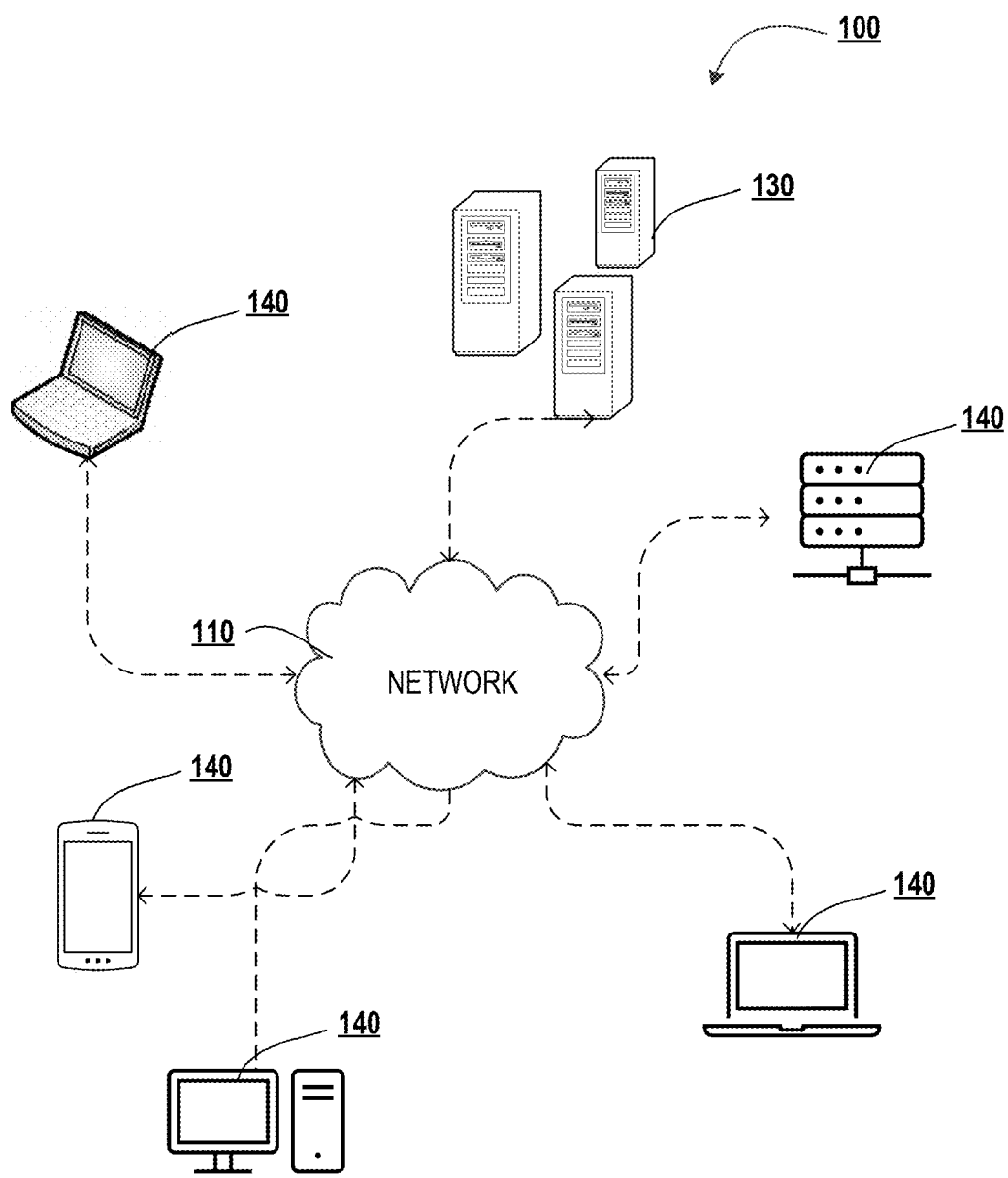
Figure 1B:
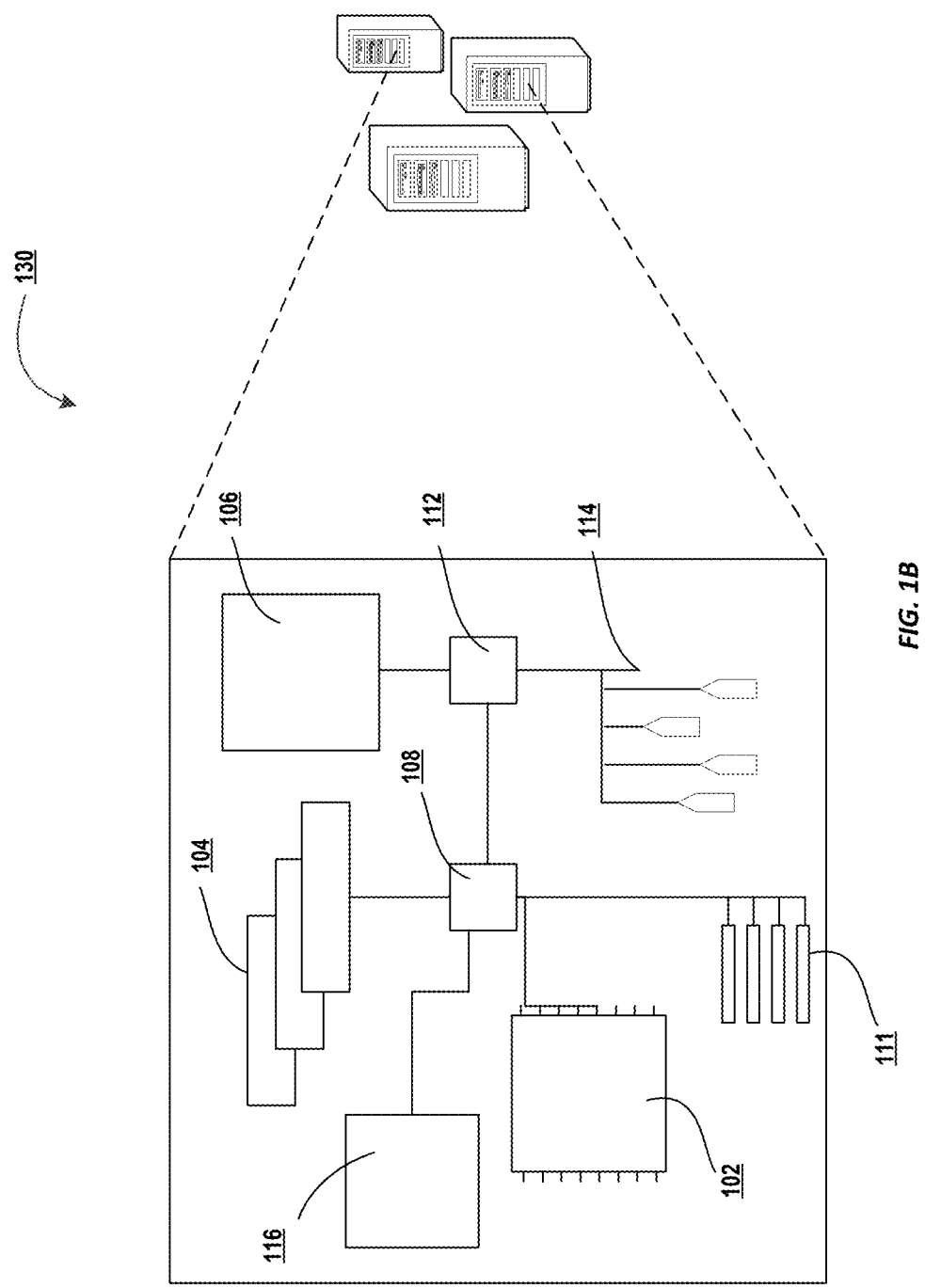

FIG. 1A illustrates technical components of exemplary distributed computing environment for analyzing micro-anomalies in anonymized electronic data, in accordance with an embodiment of the disclosure;

FIG. 1B illustrates an exemplary component-level structure of the system, in accordance with an embodiment of the disclosure.

Figure 1C:
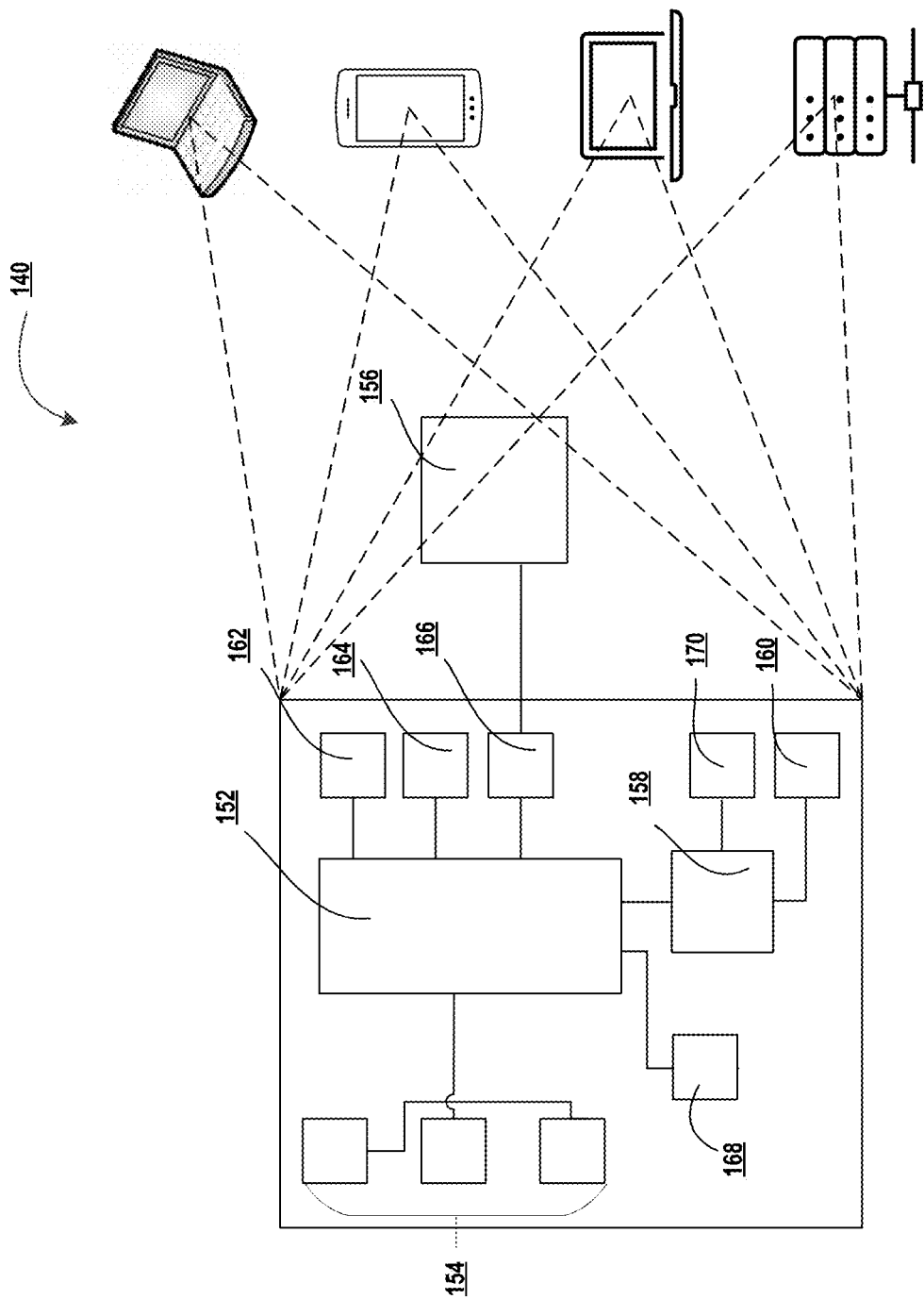
Figure 2A:
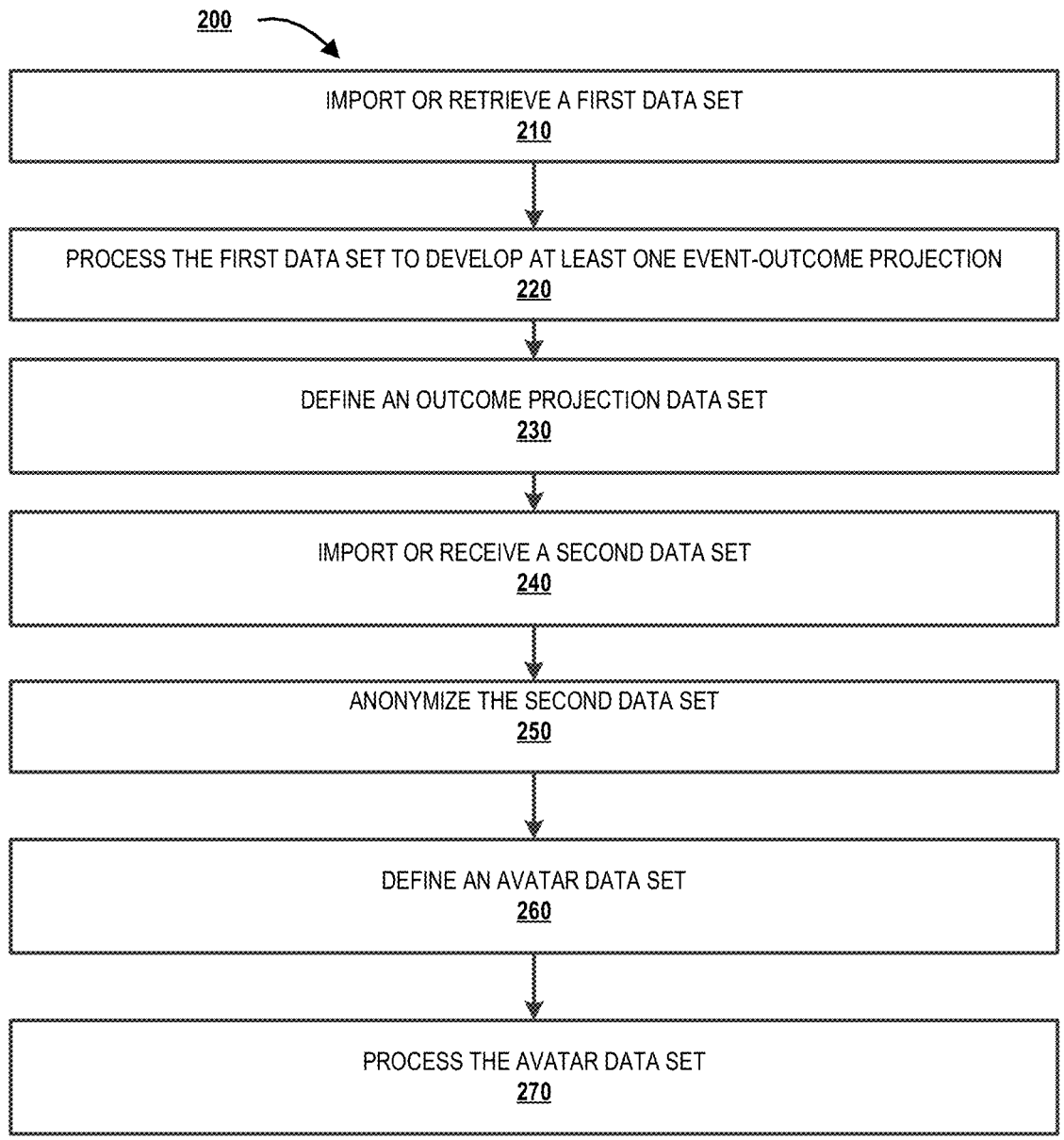

FIG. 1C illustrates an exemplary component-level structure of the end-point device(s) 140, in accordance with an embodiment of the disclosure;

FIG. 2A illustrates a process flow for analyzing micro-anomalies in anonymized electronic data, in accordance with an embodiment of the disclosure.

Figure 2B:
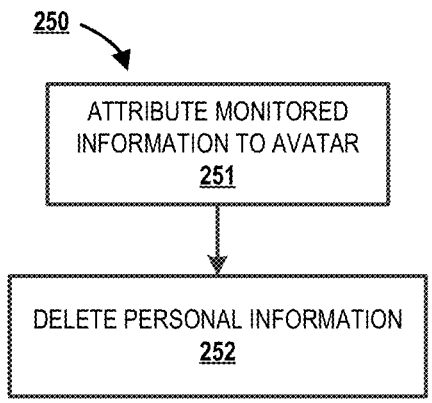

FIG. 2B illustrates a process flow for the step of anonymizing the second data set, in accordance with an embodiment of the disclosure.

Figure 2C:
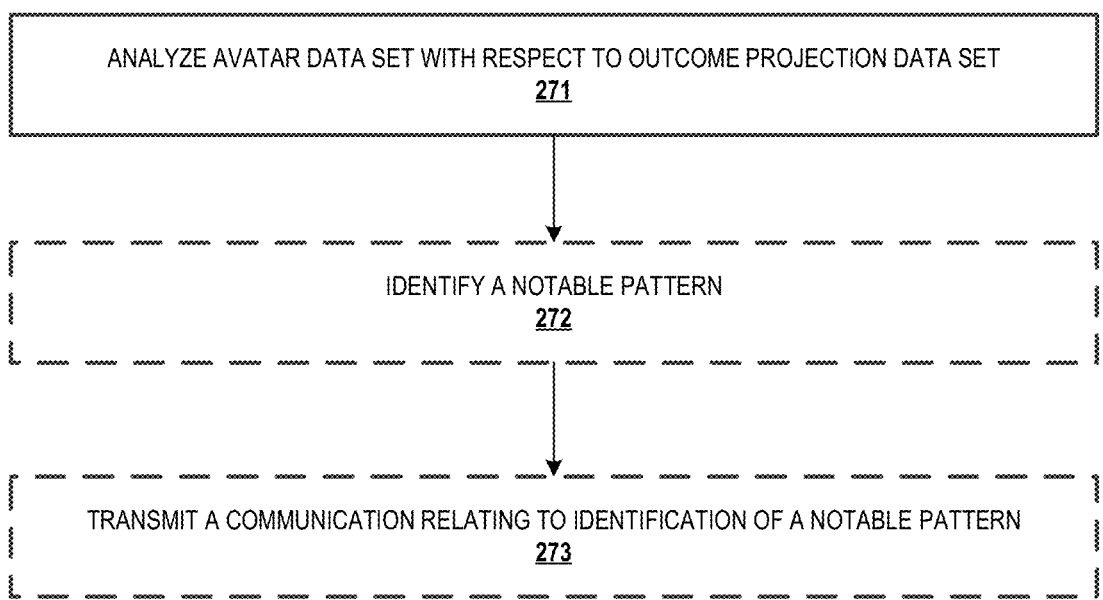

FIG. 2C illustrates a process flow for the step of processing the avatar data set, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, monitored information means information about at least one event, at least one event outcome, or a combination thereof. While the number of event(s) comprising the monitored information and the number of event outcome(s) comprising the monitored information may be the same, they may also be different and each event is not required to have a corresponding event outcome. Similarly, each event outcome can does not necessarily require an event or combination of events.

As used herein, "personal information" is any information that could be used to determine the identity of a user. For example, personal information includes a person's name, social security number, and the like. Further, personal information includes information that may be combined with other information to determine the identity of a user.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "monitored user" may be an individual associated with an entity. As such, in some embodiments, the monitored user may be an individual having past relationships, current relationships or potential future relationships with an entity. In some embodiments, the monitored user may be an employee (e.g., an associate, a project manager, an IT specialist, a manager, an administrator, an internal operations analyst, or the like) of the entity or enterprises affiliated with the entity.

As used herein, a "monitored user interface" may be a point of human-computer interaction and communication in a device that allows a monitored user to input information, such as commands or data, into a device, or that allows the device to output information to the monitored user. For example, the monitored user interface includes a graphical monitored user interface (GUI) or an interface to input computer-executable instructions that direct a processor to carry out specific functions. The monitored user interface typically employs certain input and output devices such as a display, mouse, keyboard, button, touchpad, touch screen, microphone, speaker, LED, light, joystick, switch, buzzer, bell, and/or other monitored user input/output device for communicating with one or more monitored users.

As used herein, an avatar is an electronic icon, figure, folder, or similar that information may be attributed.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a monitored user. For example, a system may prompt a monitored user to enter authentication information such as a monitored username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic monitored user activity, such as making a predefined motion with a monitored user device. This authentication information may be used to authenticate the identity of the monitored user (e.g., determine that the authentication information is associated with the account) and determine that the monitored user has authority to access an account or system. In some embodiments, the system may be owned or operated by an entity. In such embodiments, the entity may employ additional computer systems, such as authentication servers, to validate and certify resources inputted by the plurality of monitored users within the system. The system may further use its authentication servers to certify the identity of monitored users of the system, such that other monitored users may verify the identity of the certified monitored users. In some embodiments, the entity may certify the identity of the monitored users. Furthermore, authentication information or permission may be assigned to or required from a monitored user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more monitored users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "payment instrument" may refer to an electronic payment vehicle, such as an electronic credit or debit card. The payment instrument may not be a "card" at all and may instead be account identifying information stored electronically in a monitored user device, such as payment credentials or tokens/aliases associated with a digital wallet, or account identifiers stored by a mobile application.

As used herein, "temporal events" are those events that are either related to time. Temporal events may be events measured relative to the time of day, day of the week, month of the year, and the like. Where there are two or more events, occurrences, or outcomes, temporal events also include events having a significant relationship to each other. For example, temporal events may include cause and effect events or outcomes, or an event or outcome the occurrence of which routinely or inherently take place after the other event or any series of events Electronic data can be analyzed to identify patterns in various phenomena. One such example is in patterns of human behaviors. A number of conclusions can be drawn about an individual based upon their adherence to or deviation from certain behavioral patterns. These patterns can be either cultural patterns or individualized patterns (often referred to as routines). Even small deviations from cultural behavioral patterns or individualized routines often serve as markers for larger deviations and potentially adverse behaviors. These micro-deviations can be identified in order to prevent or intervene before undesirable behaviors and encourage desirable actions. However, in order to maximize the information that can be gained from recognizing the importance of these micro-anomalies, data pertaining to seemingly small, discreet events must be collected and analyzed.

In order to identify individualized patterns in an individual or compare an individual's action to cultural patterns, data comprising information about each of the discreet events in that their day must be recorded and processed in its entirety. However, data comprising personal information about an individual should be anonymized before processing in order to protect the monitored user identities and comply with applicable laws and regulations.

The present disclosure describes a solution to the privacy concerns implicated in the collection and processing of information about an individual in its entirety by parsing the personal information from information about discreet events and attributing that data to an avatar, thereby anonymizing the information. Because the avatar does not have any of the individual's personal data attributed to it, the data relating to discreet events may be freely analyzed and compared to known behavioral patterns. These known behavioral patterns can be uploaded from a database (for example, if it is known what actions a person may take before engaging in undesirable behaviors, these patterns can be uploaded for comparison) or can be developed by continuously analyzing the data attributed avatar (in order to identify an individualized routines and deviations from such routine).

What is more, the present disclosure provides a technical solution to a technical problem. As described herein, the technical problem includes issues of data privacy. The technical solution presented herein allows for usage of data without jeopardizing an individual's privacy. In particular, attributing monitored information about an individual to an avatar and processing such information in order to predict, prevent, or encourage behavioral patterns is an improvement over existing solutions to problems in physical security, diagnosis of adverse health events, and the like because it has (i) fewer steps to achieve a solution, thus reducing the amount of computing resources, such as processing resources, storage resources, network resources, and/or the like, that are being used, (ii) and likely provides a more accurate solution to the problem, thus reducing the number of resources required to remedy any errors made due to a less accurate solution. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for Analyzing Micro-Anomalies in Anonymized Electronic Data 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including monitored user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of monitored user interfaces, applications run by end-point device(s) 140, and wireless communication by end-point device(s) 140.

The processor 152 may be configured to communicate with the monitored user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a monitored user. The control interface 164 may receive commands from a monitored user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the monitored user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated monitored users (or processes) to access the protected resources of the system 130, which may include servers, databases, applications, and/or any of the components described herein. To this end, the system 130 may trigger an authentication subsystem that may require the monitored user (or process) to provide authentication credentials to determine whether the monitored user (or process) is eligible to access the protected resources. Once the authentication credentials are validated and the monitored user (or process) is authenticated, the authentication subsystem may provide the monitored user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio code 162, which may receive spoken information from a monitored user and convert the spoken information to usable digital information. Audio code 162 may likewise generate audible sound for a monitored user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2A illustrates a process flow for analyzing micro-anomalies in anonymized electronic data, in accordance with certain embodiments of the disclosure. In one aspect, the process 200 comprises a method of analyzing micro-anomalies in anonymized electronic data. In another aspect, each of the steps found in the process 200 are carried out by a processor which is configured to execute such steps. In still another aspect, the process 200 comprises a code which may be stored on a non-transitory computer readable medium and comprise a computer program product. Each of these aspects is compatible with the other aspects as well as with any embodiments described herein. Further, the steps contained in the process 200 may be executed in any order, repeated, either as a process or as an individual steps, continuously executed, executed simultaneous with the other steps, or any other variation.

Step 210 of the process 200 comprises importing or retrieving a first data set comprising a plurality of events and a plurality of event outcomes. In some embodiments, any of the plurality of events comprising the first data set may be location events. In other embodiments, any of the plurality of events comprising the first data set may be temporal events. In still other embodiments, the first data set may be data that has been previously attributed to an avatar.

Data contained in the first data set may then be processed to develop at least one event-outcome projection having (i) at least one of the events comprising the plurality of events and (ii) at least one of the event outcomes comprising the plurality of event outcomes, as shown in step 220 of the process 200. The event-outcome projection(s) may then be used to define an outcome projection data set, which contains the event-outcome projections, as described in step 230 of the process 200.

Step 240 of the process 200 comprises importing or receiving a monitored user data set, the monitored user data set comprising personal information and monitored information, which includes information about at least one event or information about at least one event outcome, or a combination, but may contain information about both event(s) and event outcome(s) (among other information). In some embodiments, the monitored information relates to the monitored user. In other embodiments, the monitored information may comprise temporal event(s) or temporal event outcome(s). In certain embodiments, importing or receiving a monitored user data set occurs continuously.

The monitored user data set may then be anonymized, as shown in step 250 of the process 200. With reference to FIG. 2B, anonymizing the monitored user data set comprises deleting the personal information 251 and attributing the monitored information to an avatar 252. Again, looking to FIG. 2A, an avatar data set is then defined (step 260 of the process 200). The avatar data set includes at least the monitored information attributed to the avatar. In preferred embodiments, the steps of importing or receiving a monitored user data set 240, anonymizing the monitored user data set 250, and defining an avatar data set 260 are repeated one or more times. In some embodiments, the avatar data set further comprises monitored information from one or more of these previous repetitions.

Step 270 of the process 200 comprises processing the avatar data set. With reference to FIG. 2C, processing the avatar data set comprises at least analyzing the avatar data set with respect to the outcome projection data set 271. In some embodiments, processing the avatar data set 270 further comprises identifying a notable pattern 272. In some such embodiments, a notable pattern is identified when there is at least one similarity between the avatar data set and the outcome projection data set. In another such embodiments, a notable pattern is identified when at least one deviation exists between the avatar data set and the outcome projection data set. In still other embodiments, the processing the avatar data further comprises transmitting a communication relating to the identification of a notable pattern 273.

In some embodiment, the processor is further configured to redefine the first data set as the avatar data set from one or more previous repetitions. In such embodiments, the steps of processing the first data set, developing at least an event-outcome projection, and defining and outcome projection data set are repeated using the newly redefined first data set. In some embodiments, machine learning can be utilized to track and identify micro-anomalies across multiple data sets.

The applications of the present disclosure are far-reaching and include (but are not limited to) early recognition of supply chain attacks, identification of behavioral patterns that law enforcement can utilize to prevent harm to the public, early recognition of an individual attempting a data security breach, recognition of patterns that are indicative of upcoming adverse health events, and more informed customer service and marketing practices.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for detecting micro-anomalies in electronic data, wherein the system comprises:
    a communication device;
    at least one non-transitory storage device; and
    at least one processor coupled to the at least one non-transitory storage device, wherein the at least one processor is configured to:
    import or retrieve a first data set, the first data set comprising a plurality of events and a plurality of event outcomes;
    process the first data set to develop at least one event-outcome projection, the event outcome projection comprising: (i) at least one of the events comprising the plurality of events and (ii) at least one of the event outcomes comprising the plurality of event outcomes;
    define an outcome projection data set, the outcome projection data set comprising the at least one event-outcome projection;
    import or receive a monitored user data set, the monitored user data set comprising personal information and monitored information, the monitored information comprising information about at least one event, at least one event outcome, or a combination thereof;
    anonymize the monitored user data set, wherein anonymizing the monitored user data set comprises deleting the personal information and attributing the monitored information to an avatar;
    define an avatar data set, the avatar data set comprising the monitored information attributed to the avatar; and
    process the avatar data set, wherein processing the avatar data set comprises analyzing the avatar data set with respect to the outcome projection data set,
    wherein the steps of import or receive a monitored user data set, anonymize the monitored user data set, and define an avatar data set are repeated one or more times.

2. The system of claim 1, wherein the avatar data set further comprises monitored information from one or more previous repetitions.

3. The system of claim 1, wherein any of import or retrieve a first data set, process the first data set to develop at least one event-outcome projection, define an outcome projection data set, and process the avatar data set are repeated one or more times.

4. The system of claim 3, wherein the step of process the first data set, develop at least one event-outcome projection, and define an outcome projection data set are repeated one or more times and the process is further configured to redefine the first data set, wherein redefining the first data set comprises defining the first data set to comprise the avatar data of the previous repetition.

5. The system of claim 1, wherein import or receive a monitored user data set occurs continuously.

6. The system of claim 1, wherein the monitored information relates to the monitored user.

7. The system of claim 1, wherein any of the at least one events comprising the monitored information set are temporal events.

8. The system of claim 1, wherein any of the plurality of events comprising the monitored information are location events.

9. The system of claim 1, wherein processing the avatar data set further comprises identifying a notable pattern.

10. The system of claim 9, wherein identifying a notable pattern comprises identifying at least one similarity between the avatar data set and the outcome projection data set.

11. The system of claim 9, wherein identify a notable pattern comprises identifying at least one deviation between the avatar data set and the outcome projection data set.

12. The system of claim 9, wherein processing the avatar data set further comprises transmitting a communication relating to the identification of the notable pattern.

13. A computer program product for analyzing micro-anomalies in anonymized electronic data, wherein the computer program product comprises at least one non-transitory computer-readable medium comprising code causing an apparatus to:
    import or retrieve a first data set, the first data set comprising a plurality of events and a plurality of event outcomes;
    process the first data set to develop at least one event-outcome projection, the event outcome projection comprising: (i) at least one of the events comprising the plurality of events and (ii) at least one of the event outcomes comprising the plurality of event outcomes;
    define an outcome projection data set, the outcome projection data set comprising the at least one event-outcome projection;
    import or receive a monitored user data set, the monitored user data set comprising personal information and monitored information, the monitored information comprising information about at least one event, at least one event outcome, or a combination thereof;
    anonymize the monitored user data set, wherein anonymizing the monitored user data set comprises deleting the personal information and attributing the monitored information to an avatar;
    define an avatar data set, the avatar data set comprising the monitored information attributed to the avatar; and
    process the avatar data set, wherein processing the avatar data set comprises analyzing the avatar data set with respect to the outcome projection data set,
    wherein the steps of import or receive a monitored user data set, anonymize the monitored user data set, and define an avatar data set are repeated one or more times.

14. The system of claim 13, wherein the avatar dataset further comprises monitored information from one or more previous repetitions.

15. The system of claim 13, wherein any of import or retrieve a first data set, process the first data set to develop at least one event-outcome projection, define an outcome projection data set, and process the avatar data set are repeated one or more times.

16. The system of claim 13, wherein processing the avatar data set further comprises identifying a notable pattern.

17. The system of claim 16, wherein processing the avatar data set further comprises transmitting a communication relating to the identification of the notable pattern.

18. A method for analyzing micro-anomalies in anonymized electronic data, the method comprising:
    importing or retrieving a first data set, the first data set comprising a plurality of events and a plurality of event outcomes;
    processing the first data set to develop at least one event-outcome projection, the event outcome projection comprising: (i) at least one of the events comprising the plurality of events and (ii) at least one of the event outcomes comprising the plurality of event outcomes;

defining an outcome projection data set, the outcome projection data set comprising the at least one event-outcome projection;

importing or receiving a monitored user data set, the monitored user data set comprising personal information and monitored information, the monitored information comprising information about at least one event, at least one event outcome, or a combination thereof;

anonymizing the monitored user data set, wherein anonymizing the monitored user data set comprises deleting the personal information and attributing the monitored information to an avatar;

defining an avatar data set, the avatar data set comprising the monitored information attributed to the avatar; and processing the avatar data set, wherein processing the avatar data set comprises analyzing the avatar data set with respect to the outcome projection data set, wherein the steps of import or receive a monitored user data set, anonymize the monitored user data set, and define an avatar data set are repeated one or more times.

19. The system of claim 18, wherein the avatar dataset further comprises monitored information from one or more previous repetitions.

20. The system of claim 18, wherein any of import or retrieve a first data set, process the first data set to develop at least one event-outcome projection, define an outcome projection data set, and process the avatar data set are repeated one or more times.

* * * * *